United States Patent
Gibson et al.

(10) Patent No.: US 8,681,423 B1
(45) Date of Patent: Mar. 25, 2014

(54) LIGHT MODULATION EMPLOYING FLUID MOVEMENT

(71) Applicant: Hewlett-Packard Development Company, L.P., Houston, TX (US)

(72) Inventors: Gary Gibson, Palo Alto, CA (US); David A Fattal, Mountain View, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 13/753,464

(22) Filed: Jan. 29, 2013

(51) Int. Cl.
| | |
|---|---|
| G02B 5/18 | (2006.01) |
| G02B 26/02 | (2006.01) |
| G02F 1/03 | (2006.01) |
| G02B 6/34 | (2006.01) |
| G09F 19/00 | (2006.01) |
| G09F 19/08 | (2006.01) |

(52) U.S. Cl.
USPC ........... 359/573; 359/245; 359/228; 359/253; 359/566; 385/37; 362/559; 362/600; 362/606; 362/607; 362/618; 40/406; 40/412; 40/422; 349/196; 349/201

(58) Field of Classification Search
USPC .......... 359/34, 228, 245, 253, 291, 296, 573, 359/886; 385/4, 8, 10, 37, 126, 129; 362/559, 600, 603, 606, 607, 613, 618; 362/621; 349/31, 34, 37, 61, 63, 114, 196, 349/201; 40/406, 407, 411, 412, 421, 422
See application file for complete search history.

(56) References Cited

U.S. PATENT DOCUMENTS

| | | | | |
|---|---|---|---|---|
| 3,980,395 | A  * | 9/1976 | Giallorenzi et al. | 349/196 |
| 6,120,839 | A | 9/2000 | Comiskey et al. | |
| 7,301,601 | B2 * | 11/2007 | Lin et al. | 349/201 |
| 7,430,355 | B2 | 9/2008 | Heikenfeld et al. | |
| 7,872,790 | B2 * | 1/2011 | Steckl et al. | 359/253 |
| 8,363,298 | B2 * | 1/2013 | Ryytty | 359/245 |
| 8,498,053 | B2 * | 7/2013 | Futterer et al. | 359/573 |
| 2008/0297880 | A1 | 12/2008 | Steckl et al. | |
| 2009/0296218 | A1 | 12/2009 | Ryytty | |
| 2010/0079358 | A1 | 4/2010 | Daniel et al. | |
| 2010/0134872 | A1 | 6/2010 | Johnson et al. | |
| 2012/0092750 | A1 | 4/2012 | Kroll et al. | |

OTHER PUBLICATIONS

G. Roelkens et al., "Interfacing optical fibers and high refractive index contrast waveguide circuits using diffractive grating couplers," Proc. of SPIE, vol. 7218, 2009, pp. 721808-1-721808-10.

Yeo et al., "Electrowetting, Applications," Encyclopedia of Microfluidics and Nanofluidics (ed. D Li), 2008, pp. 606-615.

Heikenfeld et al., "Flat Electrowetting Optics," IEEE LEOS Newsletter, 2006, pp. 4-10.

Hou et al., "Electrowetting manipulation of any optical film," Applied Physics Letters, 90, 251114, 2007, pp. 251114-1-251114-3.

* cited by examiner

*Primary Examiner* — Loha Ben

(57) ABSTRACT

A light modulator includes a light guide to guide light, a diffraction grating at a surface of the light guide, and a fluid having a refractive index substantially matched to a refractive index of the diffraction grating. The diffraction grating is to couple out a portion of guided light from the light guide using diffractive coupling. The index-matched fluid is to be selectively moved both into contact with the diffractive grating to defeat the diffractive coupling and out of contact with the diffraction grating to facilitate the diffractive coupling to modulate the coupled out guided light.

15 Claims, 4 Drawing Sheets

LIGHT MODULATION EMPLOYING FLUID MOVEMENT

CROSS-REFERENCE TO RELATED APPLICATIONS

N/A

STATEMENT REGARDING FEDERALLY SPONSORED RESEARCH OR DEVELOPMENT

N/A

BACKGROUND

Light modulators or more generally electro-optic modulators are employed in a variety of applications ranging from optical communications to electronic displays. For example, light modulators may be employed to modulate light emitted by a backlight in many modern electronic displays. The light modulators may modulate the emitted light in discrete spatially separated regions of the electronic display representing pixels. For example, liquid crystal cells may be employed to modulate light from a backlight to produced pixels of an electronic display. Light emitted by the backlight is directed through and modulated by the liquid crystal cell to vary an intensity of the light emitted by the pixel, for example. Light modulators used in optical communications may employ any of a variety of means including, but not limited to, amplitude modulation, phase modulation and polarization modulation to encode information for transmission on an optical beam within an optical transmission line (e.g., a fiber optic cable).

As suggested above, light modulators may be used to vary or modulate one or more of amplitude or intensity, phase and polarization of a light beam, for example. Light modulators that modulate light using amplitude modulation (i.e., optical amplitude modulators) are sometimes referred to as light valves. Amplitude modulation in a light valve may be accomplished through a change in transmission (e.g., a transmissive light valve) or a change in reflection (e.g., a reflective light valve), for example. The change in transmission may result from a change in an absorption characteristic of the light valve, for example. A liquid crystal light valve typically provides amplitude modulation through a change in a transmission characteristic accomplished using a polarization shift of light passing through the liquid crystal light valve, for example. Reflection light valves may employ a change in direction of a light beam provided by a micromechanical mirror, for example, to affect amplitude modulation of the light beam. In addition, amplitude modulation may be accomplished using phase changes in the optical beam such as in an interferometric light valve, for example.

BRIEF DESCRIPTION OF THE DRAWINGS

Various features of examples in accordance with the principles described herein may be more readily understood with reference to the following detailed description taken in conjunction with the accompanying drawings, where like reference numerals designate like structural elements, and in which.

Figure 1A:
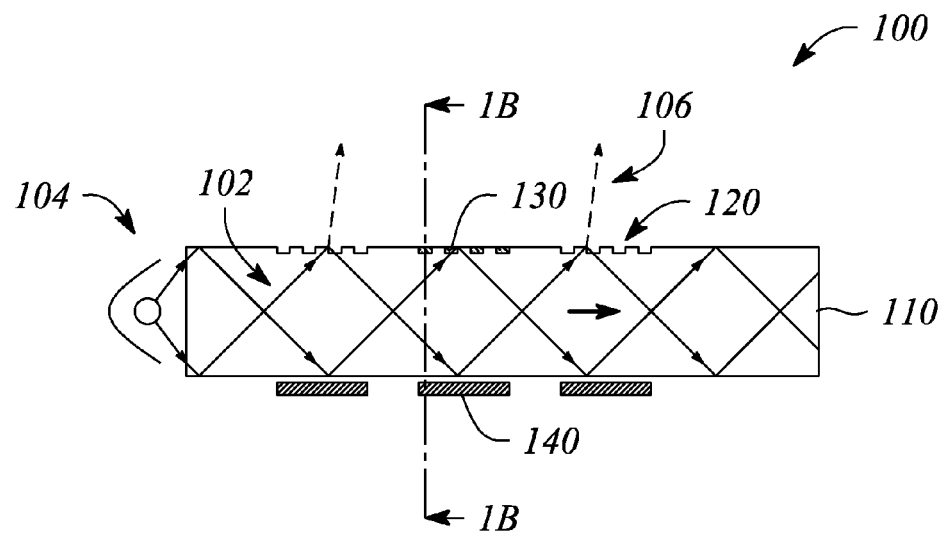
FIG. 1A illustrates a cross sectional view of a light modulator, according to an example consistent with the principles described herein.

Certain examples have other features that are one of in addition to and in lieu of the features illustrated in the above-referenced figures. These and other features are detailed below with reference to the above-referenced figures.

DETAILED DESCRIPTION

Examples in accordance with the principles described herein provide light modulation using movement of an index-matched fluid. In particular, light modulation described herein employs electrowetting or another means to move the index-matched fluid and affect a change in diffractive coupling of a diffraction grating. The change in the diffractive coupling, in turn, changes an amount of light coupled out of a light guide by the diffraction grating to modulate the coupled-out light. Among applications of the light modulation using fluid motion described herein is a modulated backlight for an electronic display, for example. In another example, the light modulation described herein may provide a modulated light field (e.g., an array of modulated beams or beamlets) for a display such as, but not limited to, an autostereoscopic three-dimensional (3-D) display (e.g., a so-called 'glasses-free' 3-D display).

According to various examples, a diffraction grating is employed to couple light out of a light guide by diffractive coupling. Movement of the index-matched fluid is used to alternately facilitate and defeat the diffractive coupling to modulate the coupled out light. The light guide may be a light guide of a backlight of an electronic display, for example. The diffraction grating includes or is made up of features (grooves, ridges, holes, bumps, etc.) formed in a surface of the light guide. The index-matched fluid is moved into contact with the diffraction grating to fill in and around the features of the diffraction grating. When the index-matched fluid is in contact with the diffraction grating, a refractive index distinction between the features and a surrounding environment is substantially mitigated. As such, the diffraction grating no longer provides diffraction and diffractive coupling is defeated or eliminated. Alternatively, when the index-matched fluid is moved out of contact with the diffraction grating, the diffraction grating operates normally to provide diffractive coupling. Movement of the index-matched fluid may be provided by a number of means including, but not limited to, one or more of electrowetting, a controllable pressure gradient, and a controllable thermal gradient.

Herein, a 'diffraction grating' is defined as a plurality of features arranged to provide diffraction of light incident on the features. Further by definition herein, the features of a diffraction grating are features formed one or both of in and on a surface of a material that supports propagation of light. For example, the material may be a material of a light guide, for example. The features may include any of a variety of features or structures that diffract light including, but not limited to, grooves, ridges, holes and bumps on the material surface. For example, the diffraction grating may include a plurality of parallel grooves in the material surface. In another example, the diffraction grating may include a plurality of parallel ridges rising out of the material surface. A diffraction angle $\theta_m$ of light diffracted by a periodic diffraction grating may be given by equation (1) as:

$$\theta_m = \sin^{-1}\left(\frac{m\lambda}{d} - \sin\theta_i\right) \quad (1)$$

where $\lambda$ is a wavelength of the light, m is a diffraction order, d is a distance between features of the diffraction grating, and $\theta_i$ is an angle of incidence of the light on the diffraction grating. According to various examples, a material of the diffraction grating is substantially transparent (e.g., at an operational wavelength of the diffraction grating).

In some examples, the plurality of features may be arranged in a periodic array. In some examples, the diffraction grating may include a plurality of features arranged in a one-dimensional (1-D) array. For example, a plurality of parallel grooves is a 1-D array. In other examples, the diffraction grating may include a two-dimensional (2-D) array of features. For example, the diffraction grating may be a 2-D array of bumps on a material surface. The features (e.g., grooves, ridges, holes, bumps, etc.) may have any of a variety of cross sectional shapes or profiles that provide diffraction including, but not limited to, one or more of a rectangular profile, a triangular profile and a saw tooth profile.

Herein, 'diffractive coupling' is defined as coupling of an electromagnetic wave (e.g., light) across a boundary between two materials as a result of diffraction (e.g., by a diffraction grating). For example, a diffraction grating may be used to couple out light propagating in a light guide by diffractive coupling across a boundary of the light guide. The diffractive coupling substantially overcomes total internal reflection that guides the light within the light guide to couple out the light, for example.

Further herein, a 'light guide' is defined as a structure that guides light within the structure using total internal reflection. In particular, the light guide may include a 'core' that is substantially transparent at an operational wavelength of the light guide, according to some examples. In some examples, the term light guide generally refers to a dielectric optical waveguide that provides total internal reflection to guide light at an interface between a dielectric material of the light guide and a material or medium that surrounds that light guide. For example, a refractive index of the light guide material may be greater than a refractive index of the surrounding medium to provide total internal reflection of the guided light. In some example, the light guide may include a coating in addition to or instead of the aforementioned refractive index difference to provide the total internal reflection. The coating may be a reflective coating, for example. According to various examples, the light guide may be any of several light guides including, but not limited to, one or both of a plate or slab guide and a strip guide.

Further still, as used herein, the article 'a' is intended to have its ordinary meaning in the patent arts, namely 'one or more'. For example, 'a grating' means one or more gratings and as such, 'the grating' means 'the grating(s)' herein. Also, any reference herein to 'top', 'bottom', 'upper', 'lower', 'up', 'down', 'front', back', 'left' or 'right' is not intended to be a limitation herein. Herein, the term 'about' when applied to a value generally means within the tolerance range of the equipment used to produce the value, or in some examples, means plus or minus 10%, or plus or minus 5%, or plus or minus 1%, unless otherwise expressly specified. Moreover, examples herein are intended to be illustrative only and are presented for discussion purposes and not by way of limitation.

Figure 1B:
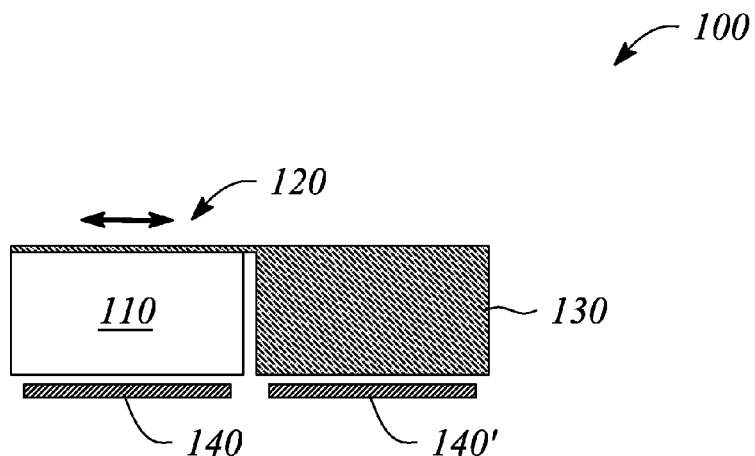
FIG. 1B illustrates another cross sectional view of the light modulator illustrated in FIG. 1A, according to an example consistent with the principles described herein.

FIG. 1A illustrates a cross sectional view of a light modulator 100, according to an example consistent with the principles described herein. FIG. 1B illustrates another cross sectional view of the light modulator 100 illustrated in FIG. 1A, according to an example consistent with the principles described herein. In particular, FIG. 1B illustrates a cross sectional view in a cross section plane that is orthogonal to a cross section plane of FIG. 1A.

According to various examples, the light modulator 100 is configured to couple out and modulate a portion of light 102 provided by a light source 104 using fluid-motion-based modulation. In particular, the coupled out and modulated portion of the light 102 may be emitted by light modulator 100 as emitted light 106. In some examples, emitted light 106 is emitted as a beam of light. The emitted light 106 beam may have both a predetermined direction and a relatively narrow angular spread, in some examples. In various examples, the emitted light 106 is configured to propagate in a direction away from the light modulator 100 that is substantially different from a propagation direction of the light 102 within the light modulator 100. For example, the emitted light 106 as a light beam may propagate in a direction that is substantially perpendicular to a general propagation direction of the light 102 propagating within the light modulator 100. The general propagation direction of the light 102 within the light modulator 100 is illustrated by a heavy arrow in FIG. 1A.

The emitted light 106 (e.g., light beam 106) has an intensity or brightness determined by or that is a function of the fluid motion-based modulation. In some examples, the fluid motion-based modulation is configured to switch or change the intensity of the modulated light 106 between two states. For example, a first or 'ON' state of the two states may be a full or maximum intensity of the modulated light 106, while a second or 'OFF' state may represent a minimum intensity of the modulated light 106 that is produced by the light modulator 100. In other examples, the fluid motion-based modulation may produce the modulated light 106 having a plurality of intensity values or states. The plurality of intensity states may range between the ON state and the OFF state, for example.

In various examples, the light source 104 may be substantially any source of light including, but not limited to, one or more of a light emitting diode (LED), a fluorescent light and a laser. In some examples, the light source 104 may produce a substantially monochromatic light 102 having a narrow-band spectrum denoted by a particular color. In particular, the color of the monochromatic light 102 may be a primary color of a particular color gamut or color model (e.g., a red-green-blue (RGB) color model). For example, the light source 104 may be a red LED and the monochromatic light 102 is the color red. In another example, the light source 104 may be a green LED and the monochromatic light 102 is substantially green in color. In yet another example, the light source 104 may be a blue LED and the monochromatic light 102 is substantially blue in color. In other examples, light 102 provided by the light source 104 has a substantially broadband spectrum. For example, the light 102 produced by the light source 104 may be white light. The light source 104 may be a fluorescent light that produces white light, for example.

As illustrated in FIGS. 1A-1B, the light modulator 100 includes a light guide 110. The light guide 110 is configured to guide the light 102 from the source 104. In some examples, the light guide 110 guides the light 102 using total internal reflection. For example, the light guide 110 may include a dielectric material configured as an optical waveguide. The dielectric material may have a first refractive index that is greater than a second refractive index of a medium surrounding the dielectric optical waveguide to facilitate total internal reflection of the light 102 guided according to one or more guided modes in the light guide 110, for example.

For example, the light guide 110 may be a strip optical waveguide including or being made up of an extended, substantially rectangular strip of dielectric material, as illustrated in FIG. 1B. The rectangular strip of dielectric material is configured to guide the light 102 through total internal reflection. In other examples, the light guide 110 may be another dielectric optical waveguide including, but not limited to, a slab or planar waveguide and an optical fiber, or a combination of two or more waveguide types. In some examples, the light guide 110 may include one or more cladding layers on a surface of the light guide 110. The cladding layer may facilitate total internal reflection, for example. In some examples, the guided light 102 may be coupled into an end of the light guide 110 and propagate along a length thereof. Coupling light into the light guide 110 at the end thereof may be facilitated by a lens (not illustrated), for example. According to various examples, the light guide 110 may include any of a variety of dielectric materials including, but not limited to, various types of glass (e.g., silica glass) and transparent plastics (e.g., acrylic).

As illustrated in FIG. 1A, the guided light 102 may propagate along the light guide 110 in a generally horizontal direction. Propagation of the guided light 102 is illustrated in FIG. 1A as a plurality of extended arrows representing optical beams. The optical beams may represent plane waves of propagating light associated with one or more of the optical modes of the light guide 110, for example. The optical beams of the guided light 102 are further illustrated as 'bouncing' or reflecting off of walls of the light guide 110 at an interface between the material (e.g., dielectric) of the light guide 110 and the surrounding medium to represent total internal reflection responsible for guiding the guided light 102.

The light modulator 100 illustrated in FIGS. 1A and 1B further includes a diffraction grating 120. The diffraction grating 120 is configured to couple out a portion of the guided light 102 from the light guide 110 by diffractive coupling. According to various examples, diffractive coupling couples out a portion of the guided light 102 in a direction that is different from a direction of propagation in the light guide 110. For example, the coupled out portion of the guided light may be directed away from a surface of the light guide 110 at a diffraction angle relative to the light guide 110. The diffraction angle may be between 60 and 120 degrees, for example. As illustrated, the diffraction angle is about 90 degrees. According to various examples (e.g., as illustrated), the coupled out portion of the guided light 102 is the emitted light 106. A dashed line is used to illustrate the emitted light 106 to emphasize that the emitted light 106 is modulated.

According to various examples, the diffraction grating 120 is located at a surface of the light guide 110. In particular, the diffraction grating 120 may be formed in a surface of light guide 110, in some examples. For example, the diffraction grating 120 may include a plurality of grooves or ridges that either penetrate into or extend from, respectively, the surface of the light guide 110. The grooves may be milled or molded into the surface, for example. As such, a material of the diffraction grating 120 may be a material of the light guide 110, according to some examples. For example, as illustrated in FIG. 1A, the diffraction grating 120 includes parallel grooves that penetrate the surface of the light guide 110. In other examples (not illustrated), the diffraction grating 120 may be a film or layer applied or affixed to the light guide surface. In some examples, the grooves or ridges are substantially perpendicular to a propagation direction of the guided light 102 in the light guide 110. In other examples, the grooves or ridges may be oriented on the surface of the light guide at slant to the propagation direction (e.g., an angle other than perpendicular).

As illustrated in FIGS. 1A and 1B, the light modulator 100 further includes an index-matched fluid 130 that is configured to be moved in a controlled or selective manner. In some examples, the index-matched fluid 130 is configured to be selectively moved by electrowetting. As such, the light modulator 100 may be referred to as an electrowetting light modulator 100. In other examples, selective motion of the index-matched fluid is provided by another means including, but not limited to, a controllable pressure gradient, a controllable thermal gradient, and a combination of two or more means.

According to various examples, the index-matched fluid 130 may be selectively moved one or both of into contact with the diffraction grating 120 and out of contact with the diffraction grating 120, according to various examples. Movement of the index-matched fluid 130 into contact and out of contact with the diffraction grating 120 is illustrated by a double-headed arrow in FIG. 1B. When the index-matched fluid 130 is selectively moved into contact with the diffraction grating 120, the index-matched fluid 130 is configured to defeat the diffractive coupling of guided light 102 by the diffraction grating 120. In particular, when the index-matched fluid 130 is in contact with the diffraction grating 120, the diffraction grating 120 may be prevented from diffractively coupling out the portion 106 of the guided light 102 from the light guide 110. Alternatively, diffractive coupling may occur and in some examples, is facilitated when the index-matched fluid 130 is selectively moved out of contact with the diffraction grating 120. For example, when the index-matched fluid 130 is not in contact with the diffraction grating 120, the diffraction grating 120 is able to provide diffractive coupling of the guided light 102 to produce the emitted light 106.

In some examples, the index-matched fluid 130 has a native or default position that is out of contact with the diffraction grating 120. In these examples, electrowetting or another means may be employed to selectively move the index-matched fluid 130 into contact with the diffraction grating 120, for example. In some examples, the index-matched fluid 130 has a native or default position that is in contact with the diffraction grating 120. In these examples, electrowetting or another means may be employed to selectively move the index-matched fluid 130 out of contact with the diffraction grating 120. In yet other examples, electrowetting or another means is employed to selectively move the index-matched fluid 130 both into contact and out of contact with the diffraction grating 120.

In some examples, the index-matched fluid 130 is configured to be moved (e.g., by electrowetting) in a lateral direction. In these examples, the index-matched fluid 130 may be moved to a side of the light guide 110 when the index-matched fluid 130 is out of contact with the diffraction grating 120, for example. In other examples, the index-matched fluid 130 is configured to be moved to a side of the diffraction grating 120 but may remain on or adjacent to a surface of the light guide 110. For example, the diffraction grating 120 may extend over only a portion of the light guide 110 and the index-matched fluid 130 is only moved laterally out of contact with the diffraction grating 120 but remains in contact with the surface of the light guide 110 (e.g., beyond the diffraction grating 120). While remaining in contact with the surface of the light guide 110, the index-matched fluid 130 may be isolated from the light guide 110 itself (e.g., by a separation or material layer) to prevent or minimize light leakage, according to some examples. In yet other examples, the index-matched fluid 130 is moved out of features (e.g., grooves) of the diffraction grating 120 when 'out of contact' with the diffraction grating 120 and into the features when 'in contact,' as is described in more detail below. The index-matched fluid 130 may still be in contact with a portion of the diffraction grating 120 while being substantially out of contact with the diffraction grating 120 to facilitate diffractive coupling, for example.

According to various examples, the index-matched fluid 130 has a refractive index that is substantially matched with a refractive index of a material of the diffraction grating 120. In some examples, the index-matched fluid 130 has a refractive index that is matched to within about 10-20 percent of the refractive index of the material of the diffraction grating 120. By 'matched to within' it is meant substantially matched with the refractive index but for a small stated percentage unmatched. In some examples, the refractive index of the index-matched fluid 130 is matched to within less than about 5 percent of the diffraction grating 120 material refractive index. In some examples, the refractive indices of the index-match fluid 130 and the diffraction grating 120 are matched to within less than about 1 percent. Additionally, the index-matched fluid 130 may be substantially transparent at an operational frequency of the light modulator 100.

In various examples, the index-matched fluid 130 substantially fills features of the diffraction grating 120 to defeat the diffractive coupling when the index-matched fluid 130 is in contact with the diffraction grating 120. In particular, when the features are filled, the diffraction grating 120 no longer acts as a diffraction grating to diffract light. Instead, the fluid-filled diffraction grating 120 appears to the light 102 as a substantially smooth, continuous surface of the light guide 110.

In some examples, the light modulator 100 further includes another fluid (not illustrated). According to various examples, the other fluid has a refractive index that is substantially mismatched with the refractive index of the diffraction grating material. As such, the other fluid may be referred to as an 'index-mismatched' fluid. Further, the index-mismatched fluid is immiscible with the index-matched fluid 130, according to various examples.

In various examples, the index-mismatched fluid is configured to be in contact with the diffraction grating 120 when the index-matched fluid 130 is out of contact with the diffraction grating 120. For example, when the index-matched fluid 130 is moved out of contact with the diffraction grating 120 (e.g., by electrowetting), the index-mismatched fluid may be moved into contact with the diffraction grating 120. In some examples, the index-mismatched fluid may further facilitate the diffractive coupling when in contact with the diffraction grating 120. For example, the mismatch between the refractive index of the diffractive grating 120 and the index-mismatched fluid may enhance the diffractive coupling. Further, the index-mismatched fluid may be substantially transparent at an operational frequency of the light modulator 100 to facilitate transmission of the coupled portion of the guided light 102 (i.e., emitted light 106) through the index-mismatched fluid, according to various examples. In some examples, the index-mismatched fluid may be index-matched to a cladding material or medium that surrounds the light guide 110 in areas other than at the diffraction grating 120. When the index-mismatched fluid is in contact with the diffraction grating 120, the index-mismatched fluid may act to substantially extend the cladding over the diffraction grating 120, for example.

In some examples, the index-matched fluid 130 may be a non-polar fluid and the index-mismatched fluid may be a polar fluid. For example, the index-matched fluid 120 may be an optically transparent oil, while the index-mismatched fluid may be water (or an aqueous solution that includes water). Other non-polar fluids such as, but not limited to, fluorocarbon liquids, silicone or various siloxane liquids, and mixtures thereof, may be used as the index-matched fluid 130, in some examples. In another example, the index-matched fluid 130 may be an optically transparent fluid (e.g., either polar or non-polar) and the index-mismatched fluid may be air. In addition to water and air, various aqueous solutions including, but not limited to, saline solutions as well as other polar solvents may be employed as the index-mismatched fluid, according to some examples.

In some examples, the light modulator 100 further includes an electrode 140. The electrode 140 is used to provide an electric field that produces the movement of the index-matched fluid 130. For example, the electric field may produce electrowetting to affect movement of the index-matched fluid 130. In some examples, a plurality of electrodes may be employed. In particular, as illustrated in FIG. 1B, the light modulator 100 includes a first electrode 140 and a second electrode 140'. Application of a first voltage to the first electrode 140 may be used to move the index-matched fluid 130 into contact with the diffraction grating 120 (e.g., by electrowetting), according to some examples. Further, application of a second voltage to the second electrode 140' may be used to move the index-matched fluid 130 out of contact with the diffraction grating 120 (e.g., by electrowetting), according to some examples. In some examples, one of the first and the second voltage may be approximately zero volts (0 V) while the other voltage is substantially different from zero volts. In some examples, a difference in a bias voltage or potential between the first electrode 140 and the second electrode 140' is used to move the index-matched fluid 130 one or both of into and out of contact with the diffraction grating 120.

In some examples (as illustrated in FIG. 1B), the first electrode 140 may be located under the light guide 110. In some examples (as illustrated), the second electrode 140' may be located laterally away from and to a side of the light guide 110. In other examples (not illustrated), the first electrode 140 may be located under the light guide 110 and the second electrode 140' may be located over the light guide 110. An electric field formed between the first and second electrodes 140, 140' may induce the motion of the index-matched fluid 130, according to some examples. In some examples (not illustrated), one of the first and second electrodes 140, 140' may be in electrical contact with one or both of the index-matched fluid 130 and the index-mismatched fluid. Electrical contact may facilitate imparting an electric potential or a charge to the fluid(s), for example. The imparted electric potential or charge may facilitate electrowetting, for example.

In some examples, the diffraction grating 120 may include a hydrophobic surface. For example, the surface of the diffraction grating 120 may be coated with polytetrafluoroethylene (PTFE). Electrowetting may be used to facilitate wetting of the hydrophobic surface by the index-mismatched fluid, when a polar fluid is employed as the index-matched fluid 130, for example. Wetting of the hydrophobic surface may facilitate movement of the fluids, for example.

In some examples, the light modulator 100 is substantially transparent. In particular, the light guide 110, the diffraction grating 120 and at least the index-mismatched fluid (e.g., air) may be optically transparent in a direction orthogonal to a direction of light propagation in the light guide 110, according to some examples. Optical transparency may allow objects on one side of the light modulator 100 to be seen from an opposite side, for example.

Figure 2A:
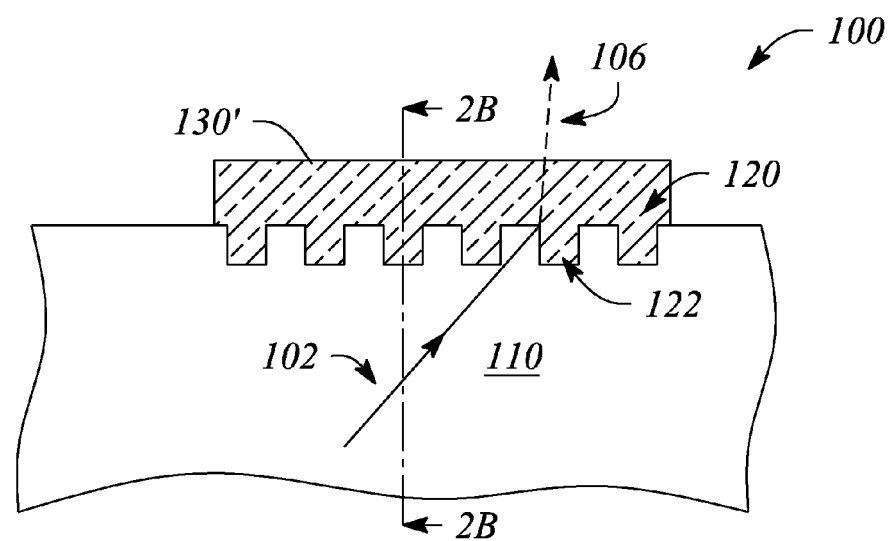
FIG. 2A illustrates a cross sectional view of a portion of a light modulator, according to an example consistent with the principles described herein.
Figure 2B:
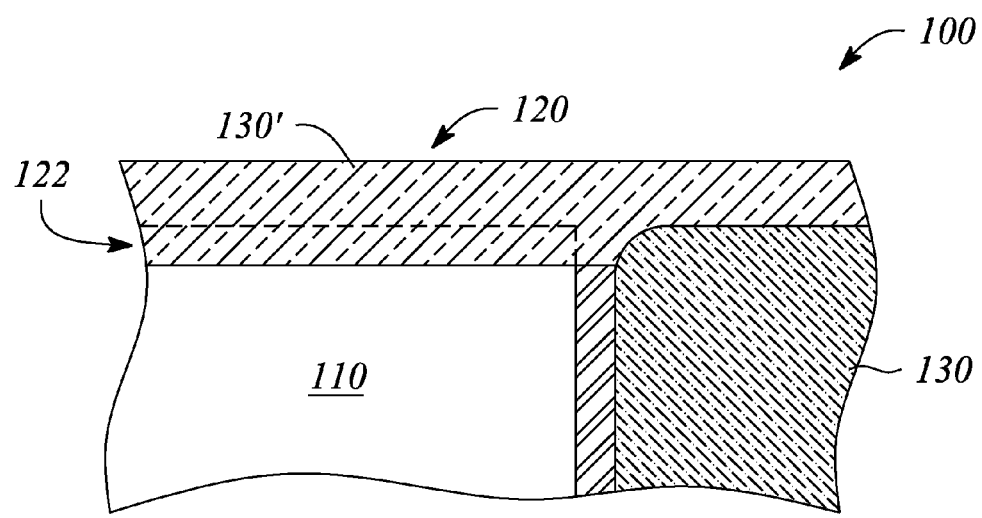
FIG. 2B illustrates another cross sectional view of the light modulator portion illustrated in FIG. 2A, according to an example consistent with the principles described herein.

FIG. 2A illustrates a cross sectional view of a portion of a light modulator 100, according to an example consistent with the principles described herein. FIG. 2B illustrates another cross sectional view of the light modulator portion illustrated in FIG. 2A, according to an example consistent with the principles described herein. In particular, FIGS. 2A and 2B illustrate orthogonal cross sectional views of the light modulator 100 portion in a first state where the index-matched fluid 130 is out of contact with the diffraction grating 120. Also illustrated in FIGS. 2A and 2B is the index-mismatched fluid 130' in contact with the diffraction grating 120. As illustrated in FIG. 2A, the guided light 102 is coupled by diffractive coupling out of the light guide 110 to produce the emitted light 106. Also illustrated in FIG. 2B, the index-matched fluid 130 is located to a side of the light guide 110, for example.

Figure 2C:
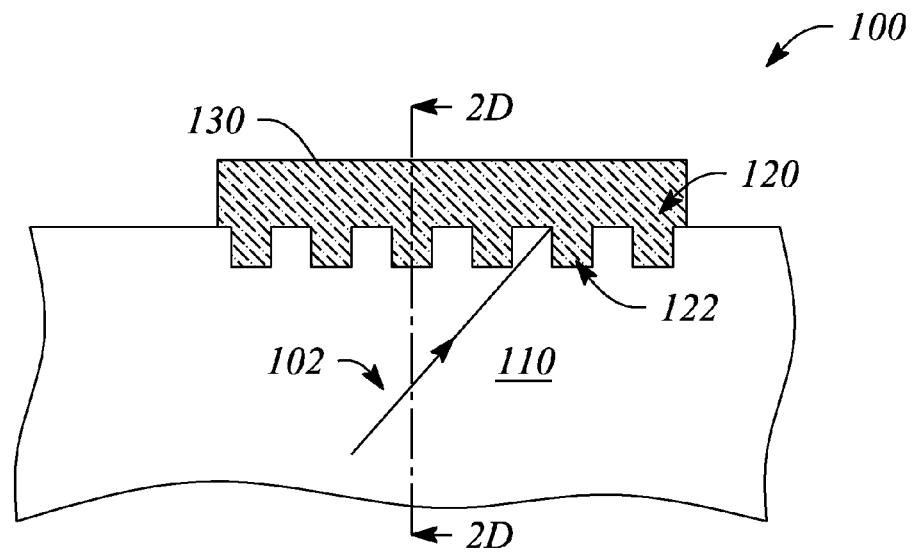
FIG. 2C illustrates a cross sectional view of a portion of a light modulator, according to an example consistent with the principles described herein.
Figure 2D:
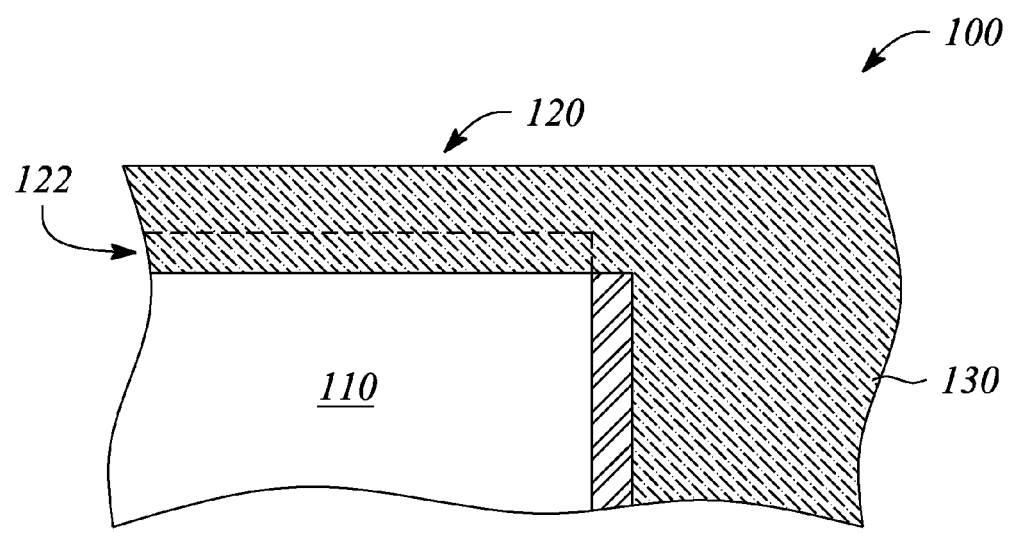
FIG. 2D illustrates another cross sectional view of the light modulator portion illustrated in FIG. 2C, according to an example consistent with the principles described herein.

FIG. 2C illustrates a cross sectional view of a portion of a light modulator 100, according to an example consistent with the principles described herein. FIG. 2D illustrates another cross sectional view of the light modulator portion illustrated in FIG. 2C, according to an example consistent with the principles described herein. In particular, FIGS. 2C and 2D illustrate orthogonal cross sectional views of the light modulator 100 in a second state where the index-matched fluid 130 is in contact with the diffraction grating 120. As illustrated in FIG. 2D, the index-matched fluid 130 substantially fills grooves 122 of the diffraction grating 120. Not illustrated in FIGS. 2C and 2D is the index-mismatched fluid 130' which is out of contact with the diffraction grating 120 in that it has been displaced by the index-matched fluid 130.

In the second state illustrated in FIGS. 2C and 2D, diffractive coupling is defeated by the contact between the index-matched fluid 130 and the diffraction grating 120 in which the grooves are substantially filled with the index-matched fluid 130. As such, the guided light 102 is not coupled out by diffractive coupling and there is no emitted light produced by the light modulator 100, as illustrated in FIG. 2C. In the configurations illustrated in FIGS. 2A-2D, both of the index-matched fluid 130 and the index-mismatched fluid 130' may be retained in a vicinity of the diffraction grating 120 (e.g., when in contact therewith) by a housing or chamber (not illustrated), for example. A portion of the housing or chamber may be optically transparent to facilitate emission of the light by the diffraction grating 120, for example.

Figure 3:
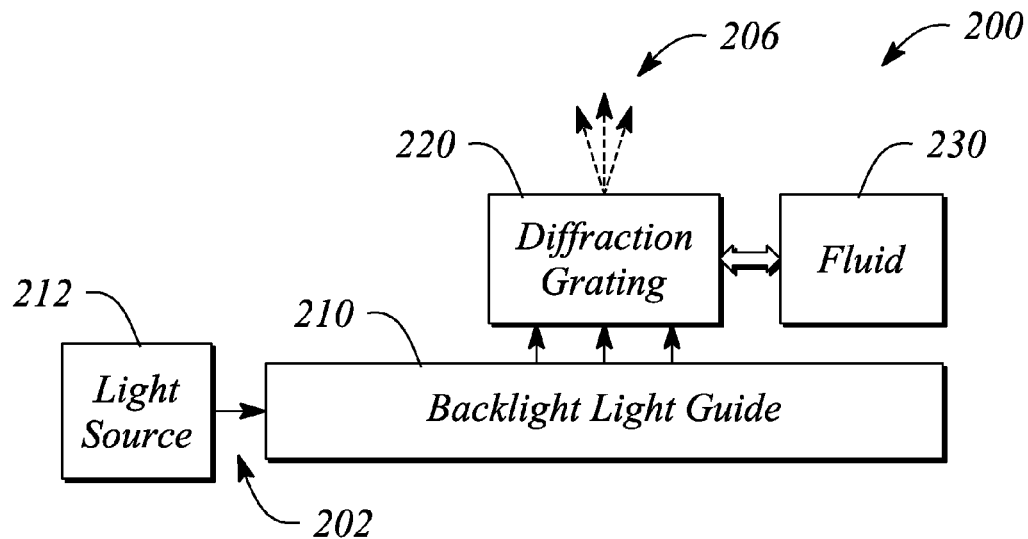
FIG. 3 illustrates block diagram of a fluid-modulated electronic display, according to an example consistent with the principles described herein.

FIG. 3 illustrates block diagram of a fluid-modulated electronic display 200, according to an example consistent with the principles described herein. According to some examples, the fluid-modulated electronic display 200 employs electrowetting-based modulation to modulate pixels of the display 200 by moving a fluid. In other examples, another means of moving a fluid other than, or in combination with, electrowetting may be employed. In particular, light 202 that is emitted as modulated light 206 by the fluid-modulated electronic display 200 is emitted to form a plurality of fluid-modulated pixels, each pixel of the plurality being separately modulated by electrowetting modulation or another fluid-motion based modulation, according to various examples. Further, in various examples, the emitted modulated light 206 may be preferentially directed toward a viewing direction of the fluid-modulated electronic display 200.

The fluid-modulated electronic display 200 illustrated in FIG. 3 includes a backlight light guide 210. The backlight light guide 210 serves as a backlight for the fluid-modulated electronic display 200 and is configured to guide light from a light source 212. The light source 212 may be substantially similar to the light source 104 described above with respect to the light modulator 100, for example. Further, in some examples, the backlight light guide 210 may be substantially similar to the light guide 110 described above with respect to the light modulator 100. For example, the backlight light guide 210 may be a strip optical waveguide. In another example, the backlight light guide 210 may be a slab or plate guide.

As illustrated in FIG. 3, the fluid-modulated electronic display 200 further includes a diffraction grating 220 formed in a surface of the backlight light guide 210. The diffraction grating 220 is configured to couple a portion of the guided light 202 out of the backlight light guide 210 by diffractive coupling. According to some examples, the diffraction grating 220 is substantially similar to the diffraction grating 120 described above with respect to the light modulator 100. For example, the diffraction grating 220 may include or be made up of a plurality of grooves or holes in a surface of the backlight light guide 210.

As illustrated, the fluid-modulated electronic display 200 further includes a fluid 230. The fluid 230 is configured to be moved by electrowetting or another means one or both of into contact with the diffraction grating 220 to defeat the diffractive coupling and out of contact with the diffraction grating 220 to facilitate the diffractive coupling. In particular, electrowetting or another means is used to selectively move the fluid 230 into contact with the diffraction grating 220 in a first state. In the first state, the fluid 230 substantially fills features (e.g., grooves, holes, etc.) of the diffraction grating 220 rendering the features inoperative and thus defeating the diffractive coupling. Electrowetting or another means is further used to selectively move the fluid 230 out of contact with the diffraction grating 220 in a second state. In the second state, the fluid 230 is substantially removed from the features of the diffraction grating 220 such that the diffractive coupling is facilitated. In some examples, an additional state or states may include selectively moving the fluid 230 into partial contact with the diffraction grating 220 e.g., to partially fill the features thereof. The partial contact may modulate light intensity of the emitted light, for example.

According to various examples, the fluid 230 and the movement thereof (e.g., by electrowetting) are substantially similar to the index-matched fluid 130 and the fluid movement described herein above with respect to the light modulator 100. In particular, according to various examples, the fluid 230 is index-matched with a refractive index of the diffraction grating 220. For example, the fluid 230 may have a refractive index that is substantially similar to a refractive index of a material of the diffraction grating 220. Further, the fluid 230 is moved laterally with respect to the backlight light guide 210, according to some examples.

In some examples, the fluid-modulated electronic display 200 further includes another fluid having a refractive index that is substantially mismatched with the refractive index of the diffraction grating material. This other fluid may be referred to as an 'index-mismatched fluid.' In some examples, the index-mismatched fluid is in contact with the diffraction grating 220 when the index-matched fluid is moved out of contact with diffraction grating 220 (e.g., by electrowetting).

Contact between the index-mismatched fluid and the diffraction grating 220 further facilitates the diffractive coupling by the diffraction grating 220, according to some examples. In some examples, the index-mismatched fluid is immiscible with the index-matched fluid 230. In some examples, the index-mismatched fluid is substantially similar to and employed in a substantially similar manner as the index-mismatched fluid described above with respect to the light modulator 100. For example, the index-mismatched fluid may be a non-polar fluid such as an optically transparent oil when the index-matched fluid 230 is a polar solvent including, but not limited to, water.

In some examples, the light source 212 is configured to provide substantially monochromatic light to be coupled out of the backlight guide 210 by the diffraction grating 220 using diffractive coupling. In some examples, the monochromatic light corresponds to a primary color of the fluid-modulated electronic display 200 and the diffraction grating 220, which serves as a sub-pixel of the fluid-modulated electronic display 200. As such, the emitted modulated light 206 is emitted from the sub-pixel. For example, the fluid-modulated sub-pixel may be a sub-pixel representing one of the primary colors of a pixel in the fluid-modulated electronic display 200 that is fluid-modulated by the index-matched fluid movement.

Figure 4:
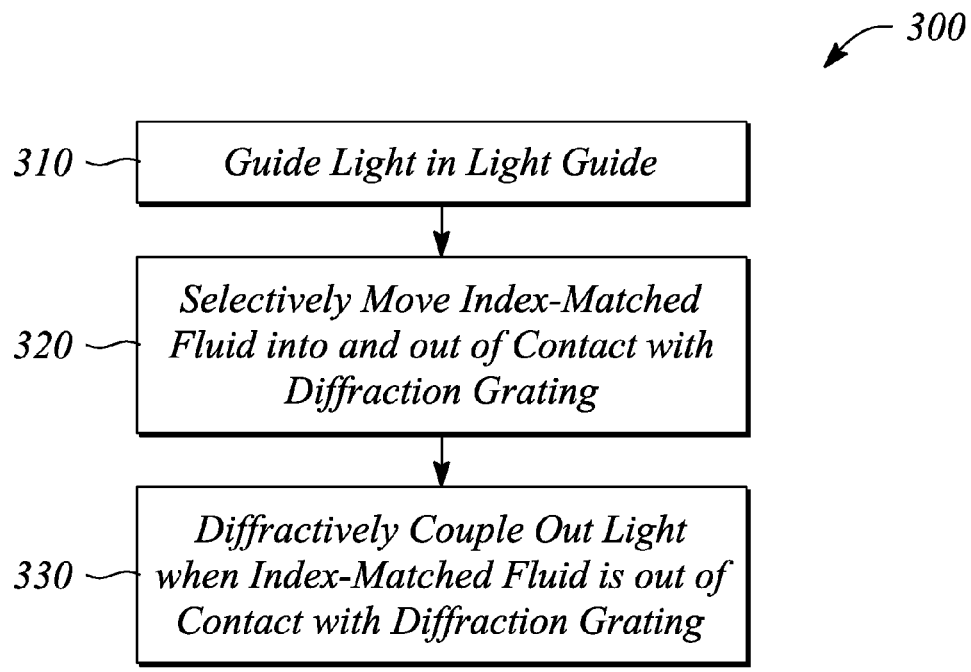
FIG. 4 illustrates a flow chart of a method of light modulation using index-matched fluid motion, according to an example consistent with the principles described herein.

FIG. 4 illustrates a flow chart of a method 300 of light modulation using index-matched fluid motion, according to an example consistent with the principles described herein. As illustrated, the method 300 of light modulation includes guiding 310 light in a light guide. In some examples, the light guide and the guided light may be substantially similar to the light guide 110 and guided light 102 described above with respect to the light modulator 100.

The method 300 of light modulation further includes selectively moving 320 an index-matched fluid into contact and out of contact with a diffraction grating at a surface of the light guide. According to various examples, the fluid is selectively moved 320 using electrowetting or another means, for example as described in more detail above. The index-matched fluid has a refractive index that substantially matches a refractive index of the diffraction grating, according to various examples. In some examples, the index-matched fluid is substantially similar to the index-matched fluid 130 described above with respect to the light modulator 100. For example, the index-matched fluid may be a non-polar fluid such as, but not limited to, a transparent oil.

According to various examples, the method 300 of light modulation further includes diffractively coupling 330 out a portion of the guided light with the diffraction grating when the index-matched fluid is out of contact with the diffraction grating. Diffractive coupling 330 out a portion of the guided light may be substantially defeated in that the guided light is not diffractively coupled out when the index-matched fluid is in contact with the diffraction grating. The coupled out portion of the guided light may be emitted modulated light, for example. The emitted modulated light may be light emitted as a pixel from an electronic display, according to some examples. The light emitted as a pixel may be preferentially directed in a viewing direction of the electronic display, for example.

In some examples, the method 300 of light modulation further includes selectively moving another fluid into contact with the diffraction grating when the index-matched fluid is out of contact with the diffraction grating. Further, the other fluid has a refractive index that is substantially mismatched with the diffraction grating refractive index, according to various examples. As such, the index-mismatched fluid in contact with the diffraction grating facilitates diffractive coupling 330 out of the light. In some examples, the other fluid is immiscible with the index-matched fluid.

In some examples, selectively moving 320 the index-matched fluid using electrowetting includes applying a first voltage to a first electrode to move the index-matched fluid into contact with the diffraction grating. Selectively moving 320 the index-matched fluid using electrowetting further includes applying a second voltage to a second electrode to move the index-matched fluid out of contact with the diffraction grating, in some examples. In some examples, the index-matched fluid is selectively moved 320 laterally with respect to the light guide. Moreover, in some examples that include the index-mismatched fluid, the first voltage may also move the index-mismatched fluid out of contact with the diffraction grating to make room for the index-matched fluid. In these examples, the second voltage may also move the index-mismatched fluid into contact with the diffraction grating as the index-matched fluid is moved out of contact therewith.

Thus, there have been described examples of a light modulator, an fluid-modulated electronic display and a method of light modulation that employs fluid motion to alternately facilitate and defeat diffractive coupling of light from a light guide. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A light modulator comprising:
a light guide to guide light;
a diffraction grating to couple out a portion of the guided light from the light guide using diffractive coupling, the diffraction grating being at a surface of the light guide; and
an index-matched fluid to be selectively moved both into contact with the diffraction grating to defeat the diffractive coupling and out of contact with the diffraction grating to facilitate the diffractive coupling to modulate the coupled out guided light, the index-matched fluid having a refractive index that is substantially matched with a refractive index of a material of the diffraction grating.

2. The light modulator of claim 1, further comprising another fluid having a refractive index that is substantially mismatched with the refractive index of the diffraction grating material, the index-mismatched fluid being in contact with the diffraction grating when the index-matched fluid is out of contact with the diffraction grating, wherein contact between the index-mismatched fluid further facilitates the diffractive coupling.

3. The light modulator of claim 2, wherein one of the index-matched fluid and the index-mismatched fluid is a polar fluid and the other of the index-matched fluid and the index-mismatched fluid is a non-polar fluid.

4. The light modulator of claim 1, wherein the index-matched fluid is to be moved in a lateral direction from a side of the light guide when out of contact with the diffraction grating.

5. The light modulator of claim 1, wherein the index-matched fluid is to be selectively moved by electrowetting.

6. The light modulator of claim 1, further comprising a first electrode and a second electrode, the index-matched fluid to be selectively moved by electrowetting into contact with the diffraction grating upon application of a first voltage to the first electrode, the index-matched fluid to be moved by electrowetting out of contact with the diffraction grating upon application of a second voltage to the second electrode.

7. The light modulator of claim 6, wherein the first electrode is located under the light guide and aligned with the diffraction grating and the second electrode is located laterally away from and to a side of the light guide.

8. The light modulator of claim 1, wherein the light modulator is substantially transparent in a direction orthogonal to a direction in which the light is guided in the light guide.

9. An electronic display comprising the light modulator of claim 1, wherein the modulated light coupled out by the diffraction grating is modulated light of a pixel of the electronic display.

10. A fluid-modulated electronic display comprising:
   a backlight light guide to guide light from a light source;
   a diffraction grating formed in a surface of the backlight light guide to couple out a portion of the guided light from the backlight light guide by diffractive coupling; and
   a fluid to be moved both into contact with the diffraction grating to defeat the diffractive coupling and out of contact with the diffraction grating to facilitate the diffractive coupling to modulate the coupled out guided light, the fluid being substantially index-matched with a refractive index of a material of the diffraction grating, the fluid being moved laterally with respect to the backlight light guide,
   wherein the coupled out portion of the guided light is directed toward a viewing direction to form a pixel of the fluid-modulated electronic display.

11. The fluid-modulated electronic display of claim 10, further comprising another fluid having a refractive index that is substantially mismatched with the refractive index of the diffraction grating material, the index-mismatched fluid being in contact with the diffraction grating when the index-matched fluid is moved out of contact with diffraction grating, wherein contact between the index-mismatched fluid and the diffraction grating to further facilitate the diffractive coupling, and wherein one or both of the index-matched fluid and the index-mismatched fluid are moved by electrowetting.

12. The fluid-modulated electronic display of claim 10, wherein the light source is to provide substantially monochromatic light to be coupled out of the backlight light guide by the diffraction grating using the diffractive coupling, the monochromatic light corresponding to a primary color of the fluid-modulated electronic display.

13. A method of light modulation using index-matched fluid motion, the method comprising:
   guiding light in a light guide;
   selectively moving an index-matched fluid both into contact and out of contact with a diffraction grating at a surface of the light guide, the index-matched fluid having a refractive index that substantially matches a refractive index of the diffraction grating; and
   diffractively coupling out a portion of the guided light with the diffraction grating when the index-matched fluid is out of contact with the diffraction grating,
   wherein diffractive coupling is substantially defeated and the guided light is not diffractively coupled out when the index-matched fluid is in contact with the diffraction grating to modulate the coupled out guided light.

14. The method of light modulation of claim 13, further comprising selectively moving another fluid into contact with the diffraction grating when the index-matched fluid is moved out of contact with the diffraction grating, the other fluid having a refractive index that is substantially mismatched with the diffraction grating refractive index and being immiscible with the index-matched fluid.

15. The method of light modulation of claim 13, wherein selectively moving the index-matched fluid employs electrowetting comprising applying a first voltage to a first electrode to move the index-matched fluid by electrowetting into contact with the diffraction grating; and applying a second voltage to a second electrode to move the index-matched fluid out of contact with the diffraction grating, wherein the index-matched fluid is selectively moved laterally with respect to the light guide.

* * * * *